Patented Jan. 12, 1932

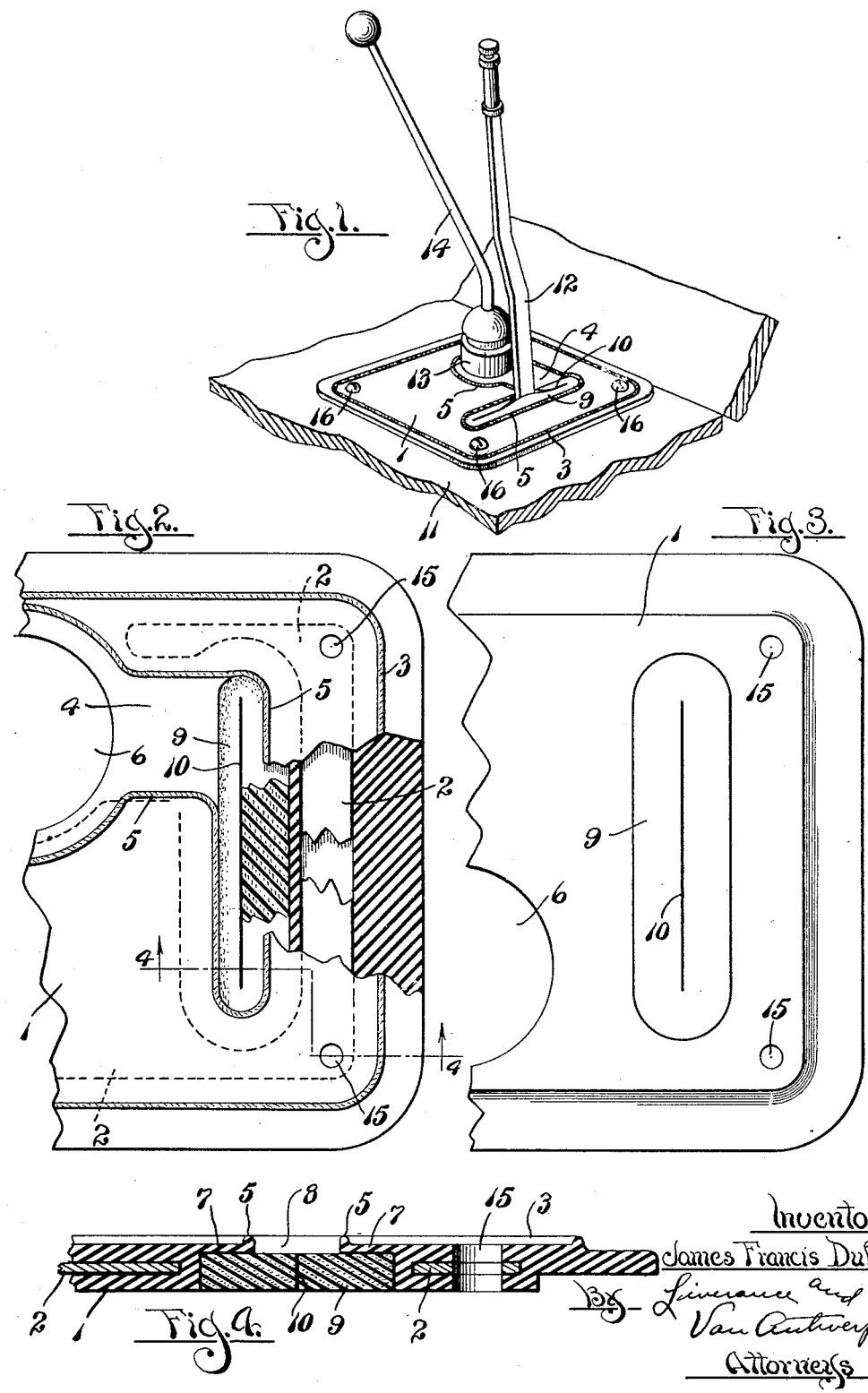

1,840,938

UNITED STATES PATENT OFFICE

JAMES FRANCIS DUFFY, OF HOLLAND, MICHIGAN, ASSIGNOR TO DUFFY MANUFACTURING COMPANY, OF HOLLAND, MICHIGAN, A CORPORATION OF MICHIGAN

DRAFT PLATE

Application filed April 8, 1929. Serial No. 353,394.

This invention relates to a draft plate and is particularly concerned with improvements in plates of this character which are used in conjunction with the floor boards and toe boards of automobiles to cover the openings through which the clutch and brake pedals and the gear shift and emergency brake levers extend. I have previously obtained Letters Patent No. 1,663,586, issued the 27th day of March, 1928, upon a toe board plate and the present invention is directed to a smilar construction with the novel improvements and constructions applying hereto for better closure of the places through which said levers and pedals extend, to obviate the passage of either cold or hot air or dust or the like into the body of the vehicle.

The present invention is found particularly desirable in conjunction with those levers or pedals which move longitudinally of a slot in the plate, this being particularly true of emergency brake levers and also true of some clutch and service brake pedals. In the plate shown in my previous patent the rubber brought directly against the sides of the pedal or lever is liable to become worn and it is difficult in some instances to obtain the desired flexibility so that it will hug the pedal or lever as tightly as may be desired.

The present invention has for its object and purpose the provision of a simple and novel means for correcting the conditions noted, as will fully appear from the following description taken in connection with the accompanying drawings, in which, Fig. 1 is a perspective view illustrating the use of the draft plate of my invention in conjunction with an emergency brake lever in an automobile.

Fig. 2 is a fragmentary enlarged plan of the draft plate, various parts being broken away and shown in section to illustrate the construction.

Fig. 3 is a fragmentary under plan thereof, and

Fig. 4 is a fragmentary transverse section substantially on the plane of the broken line 4—4 of Fig. 2.

Like reference characters refer to like parts in the different figures of the drawings.

As illustrated, the toe board 1 is of rubber within which a metal plate 2 is embedded, it being understood that the metal plate 2 is placed in the mold when the rubber is vulcanized thereon. The outer edges of the metal plate 2 are located slightly within the edges of the rubber so that the metal is entirely covered. The drawings illustrate a plate provided with an ornamental upwardly extending bead 3, the edges of the metal plate extending nearly to said bead.

Certain portions of the metal plate 2 are cut away to provide the openings for the passage or for the range of movement of the levers or pedals which pass through the plate and where said openings are made the rubber plate 1 is solid from its upper to its lower side. This section of the draft is indicated at 4, being substantially defined by the second bead 5 which extends upwardly from the plate. It is, of course, to be understood that the plate can be made without these beads 3 and 5 as they have no functional value but are for the purposes of ornamentation and appearance only.

The rubber section 4 is shown with an opening 6 therethrough and it is also shown, to one side of the opening 6, as being reduced in thickness as indicated at 7 at each side of an elongated opening 8, best shown in Fig. 4.

By reason of the reduction in thickness of the rubber leaving the thin portions 7 at the upper side, there is provided an elongated recess in the underside of the part 4, in which no metal is present. In this recess a block 9 of sponge rubber is placed and securely cemented, at its underside being flush with the underside of the draft plate as shown in Fig. 4, while the upper side is flush with the undersides of the thin portions 7. The sponge rubber member 9 is slit in the direction of its length from adjacent one end thereof nearly to the opposite end thereof, providing an elongated slit 10.

In the floor board 11 of the front or driving compartment of an automobile an opening is cut through which the emergency brake lever 12 and the mounting 13 for the gear shift lever 14 passes. The draft plate described is placed against the upper side of the floor board 11 over such opening and extending beyond the edges thereof, the emergency brake lever 12 passing upwardly through the slit 10, while the mounting 13 for the gear shift lever passes through the opening 6 in the draft plate. The draft plate is secured in place, having suitable openings 15 for the passage of screws 16 therethrough into the toe board plate. It is, of course, to be understood that any suitable equivalent means for securing the plate in place may be used.

The emergency brake lever 12, when it is operated, is moved lengthwise of the slit 10 in the sponge rubber member 9. The sponge rubber hugs the lever 12 closely at its sides, is readily yieldable, is softer than the rubber of the plate 1, is reinforced along its edges and top surface by the plate, and these characteristics make it more desirable for engagement with the lever 12 and to bring the edge at each side of the brake lever into direct and close fitted contact therewith. It is to be understood, however, that even without the addition of the sponge rubber member 9 thinning the rubber as indicated at 7 and extending the same so as to come against the sides of the brake lever is preferable to having the rubber of its full thickness at each side of the slit in which the lever 12 works.

The invention has proved very satisfactory, is practical in all respects and economical to manufacture. The appended claims define the invention which is to be considered comprehensive of all forms of structure coming within their scope.

I claim:

1. An article of the class described comprising, a plate of vulcanized rubber having an elongated opening therein, a metal plate embedded in the rubber plate between its upper and lower sides and having portions cut away a distance from the edges of said opening in the rubber plate, said rubber plate being deeply recessed at its underside around the opening therethrough whereby the rubber at the sides of the opening is thin and an elongated sponge rubber block located in said recess with its lower side flush with the lower side of the first mentioned plate and with its upper side against the thin rubber at the sides of the opening and permanently secured in said recess, said block having a longitudinal slit cut therethrough substantially midway between its sides and extending from adjacent one end thereof nearly to the opposite end.

2. An article as set forth in claim 1 in which the metal plate is entirely eliminated at a portion adjacent the said opening whereby expansive distortion of the opening at that portion is readily had.

In testimony whereof I affix my signature.

JAMES FRANCIS DUFFY.